United States Patent [19]

Nixon et al.

[11] Patent Number: 4,664,478
[45] Date of Patent: May 12, 1987

[54] METHOD OF MANUFACTURING A LIGHT VALVE

[75] Inventors: William C. Nixon; Charles E. Bryan, both of Cambridge, England

[73] Assignee: Prutec Limited, London, United Kingdom

[21] Appl. No.: 737,347

[22] PCT Filed: Sep. 20, 1984

[86] PCT No.: PCT/GB84/00321
§ 371 Date: May 14, 1985
§ 102(e) Date: May 14, 1985

[87] PCT Pub. No.: WO85/01362
PCT Pub. Date: Mar. 28, 1985

[30] Foreign Application Priority Data

Sep. 27, 1983 [GB] United Kingdom ............ 8325352

[51] Int. Cl.⁴ ............ G02F 1/133; H01R 43/00; H04B 7/02
[52] U.S. Cl. ............ 350/336; 29/825; 445/49
[58] Field of Search ............ 350/336; 313/406, 383, 313/420; 445/30, 36-38, 53, 24, 49, 52; 29/880, 825, 852, 837, 858; 65/155, 154, 59.5, 59.27, 59.6; 427/97

[56] References Cited

U.S. PATENT DOCUMENTS

| | | |
|---|---|---|
| 3,041,611 | 6/1962 | Moss . |
| 3,195,219 | 7/1965 | Woodcock et al. ............ 445/36 |
| 3,241,934 | 3/1966 | Granitsas et al. ............ 65/54.5 |
| 3,287,161 | 10/1962 | Swertz et al. ............ 29/825 |
| 3,323,198 | 1/1965 | Shortes ............ 29/852 |
| 3,424,932 | 1/1969 | Sheldon . |
| 3,600,060 | 8/1971 | Churchill ............ 350/336 |
| 3,904,914 | 9/1975 | Palac ............ 445/30 |
| 3,983,612 | 10/1976 | Palmer ............ 445/30 |
| 4,030,173 | 6/1977 | Phillips ............ 445/30 X |

FOREIGN PATENT DOCUMENTS

2163856 7/1973 France .
2029633 3/1980 United Kingdom ............ 445/36

OTHER PUBLICATIONS

Aug "Wed Pin Through-Hole Connection For Printed Circuit Boards" IBM Technical Disclosure Bulletin, vol. 15, No. 8, Jan. 1973.
Electrical Design News, vol. 16, No. 7, Apr. 1, 1971 (Denver), R. W. Forsberg, "New Design Tool 'Pipes' Electrons".
Myers, "System For Producing X-Ray Hard Copy" IBM Technical Disclosure Bulletin (NY), vol. 18, No. 1, Jun. 1975, pp. 291-292.

Primary Examiner—John K. Corbin
Assistant Examiner—David Lewis
Attorney, Agent, or Firm—Dellett, Smith-Hill & Bedell

[57] ABSTRACT

Light valve for use in the projection of an image in which a liquid crystal is addressed by an electron beam produced in a column (10). The vacuum interface of the light valve (12) consists of an electrically inhomogenous structure (54) of fine conductors arranged within an insulating matrix. The invention is concerned with the method of manufacturing the light valve vacuum interface to permit high resolution to be obtained, the method comprising filling holes in a glass capillary array, as currently used for filtration of liquids with a molten metal or alloy, and allowing the liquid to cool. The filling is effected by placing the glass capillary array in an evacuated chamber and forcing the molten alloy into the holes in the array under pressure.

9 Claims, 3 Drawing Figures

METHOD OF MANUFACTURING A LIGHT VALVE

The present invention relates to a method of manufacturing an electronically addressable light valve, which term is intended to mean a device the optical properties of which may be altered by an incident electron beam.

A light valve is generally a device which gates or modulates light. Many materials which are capable of having their optical properties dynamically altered have been used as a light valves and such valves have been constructed based on various effects including acousto-optical, electro-optical, thermo-optical and ferroelectric effects.

Although several light valve projection systems have been investigated, only a few have reached maturity and gained market acceptance, the oldest and most notable being the Eidophor. In terms of providing a useful display, typical light valve projection systems have suffered from several drawbacks including low resolution, low contrast, limited life time and cost.

The invention is particularly concerned with liquid crystal light valves. Liquid crystals are known to have their optical properties affected when exposed to an electric field and attempts have been made at addressing liquid crystals by means of an electron beam.

In constructing a light valve based upon a liquid crystal material, it is necessary for the liquid crystal material to be hermetically isolated from the evacuated space of the electron beam and it is therefore necessary to construct an interface which permits the liquid crystal to be scanned by the electron beam while containing the vacuum.

If the interface is an insulator and capacitative coupling is relied upon to alter the potential on the liquid crystal, then there occurs charge spreading which reduces the resolution of the image.

In the IBM Technical Disclosure Bulletin, Vol. 16., No. 1, pp. 353,354, there is disclosed an interface between the liquid crystal material and the electron beam apparatus which comprises a two dimensional array of conducting pins in a dielectric substrate. This avoids the problem of charge spreading but the resolution of the image is limited by the separation of the conducting pins.

Various other applications have also required an interface with a beam which comprises conductive pins in an insulating substrate. Examples of these are described in GB-A-2 029 633 which is concerned with an electrostatic printing tube and GB-P-1 509 823 which relates to electron-radiography apparatus.

The present invention seeks to enable the manufacture of an interface between an electron beam apparatus and a liquid crystal material which is capable of providing an image of high resolution.

According to the present invention, there is provided a method of manufacturing an interface between a liquid crystal and the evacuated space of an electron beam apparatus, which interface comprises a plurality of conductive portions which extend across the thickness of an insulating substrate and which are electrically isolated from one another, the method being characterised by the steps of placing a glass substrate having a two dimensional array of holes of the desired size and separation formed therein within a chamber, firmly supporting the glass substrate against a backing plate, placing a solid block of alloy within the chamber, evacuating the chamber, applying heat to melt the alloy and urging a piston movable within the chamber towards the glass substrate to force the molten alloy into the evacuated holes in the glass substrate.

The molten alloy does not flow into the holes in the glass substrate with ease on account of surface tension effects. However, by first evacuating the holes and forcing the molten alloy into the holes under pressure, it is possible to fill the holes and when the alloy solidifies a plurality of conductive pins are left within the substrate which also render the interface vacuum tight so that it may form part of the vacuum envelope of an electron beam apparatus.

Glass substrates suitable for the manufacture of the interface are commercially available and are used as fluid filters. They are believed to be manufactured by pulling glass fibres of one type of glass through a second type of glass which has different etching properties. Several coated fibres are fused together and then etched. The etching leaves fine holes in the positions of the original fibres. By this method, it is possible to form holes which are 10 microns, or less, apart but the structure is rather fragile. The invention permits such a substrate to be filled with a conductive alloy and the risk of breakage of the substrate as a result of the applied pressure is reduced by the use of the backing plate, which should match the contours of the substrate closely. The glass and the backing plate will normally be ground flat.

It is preferred that the chamber be evacuated while the solid alloy rests against the glass substrate. To assist in evacuating the holes in the glass substrate holes are preferably formed in the solid alloy before it is molten and heat is applied to the alloy only after the chamber has been evacuated.

Conveniently, the alloy may be melted by means of a resistive heater disposed within the piston. Alternative other means, such as induction heating, may be employed for heating the alloy within the evacuated chamber.

It is important to be able to control the heating and cooling rate of the alloy. If the chamber is made of a good thermal conductor, it is difficult to control the temperature with accuracy in view of the significant heat losses through the chamber walls. It is therefore preferred that the substrate and the alloy be confined within a insulating block within the chamber to restrict the heat losses.

It may prove advantageous to provide a further electrode adjacent but electrically isolated from the array of pins, for example to prevent a build up of charge on the insulating matrix.

To enable such an electrode to be formed on the interface, the embedded electrically conductive portions or pins may be etched so that their ends lie beneath the surface of the insulating matrix and an electrically conductive layer may then be formed on the surface, the resulting electrode thereby being spaced from the ends of the embedded pins.

The invention will now be described further, by way of example, with reference to the accompanying drawings, in which.

Figure 1:
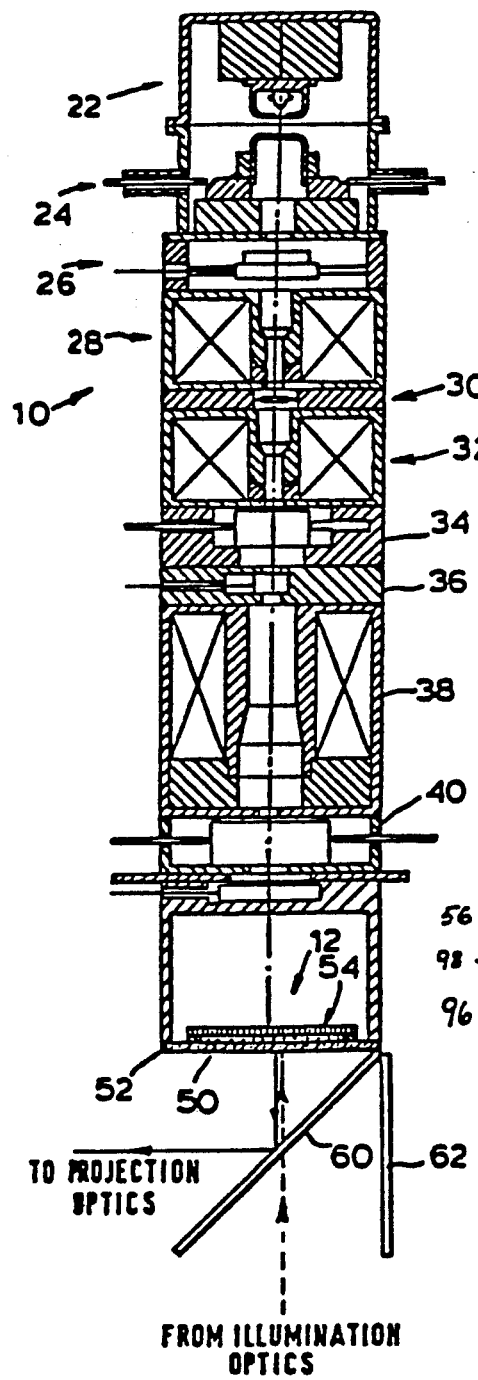
FIG. 1 shows a light valve projection system.

In FIG. 1, there is shown a light valve projection system in which the image on the liquid crystal is viewed by reflection. The system comprises an electron beam column, generally designated 10, which scans a light valve 12. The light valve 12 is viewed from the opposite side to the electron beam by means of a light source which illuminates the liquid crystal by way of illumination optics and a dielectric mirror 60. The light reflected by the liquid crystal is again reflected by the dielectric mirror towards projection optics which focus the light on a viewing screen. A light absorber 62 reduces undesired reflections.

Though the preferred system described above views the light valve by reflection, it is alternatively possible for the image to be viewed by transmission.

The electron beam column 10 is generally similar to that used in an electron microscope and is itself known. The device comprises an electron gun 22 and an anode stage 24. The electron beam passes through a first spray aperture 26 into a first focussing lens 28 and then passes through a second spray aperture 30 into a second lens 32. The spray apertures cut out any scattered electrons in order to maintain contrast and image purity. Also arranged within the path of the electron beam is a stigmator 34, a vacuum isolation valve 36, a probe forming lens 38 and high resolution deflection coils 40. The stigmator corrects any astigmatism in the beam.

The electron beam column described above is complex because of the fact that is has been designed as part of a test apparatus to permit very considerable control over the focussing, scanning and modulation of the electron beam. In any practical embodiment, the electron beam column may be considerably simplified.

If the image is viewed by transmission, it may be necessary to arrange the plane of the light valve at an angle to the electron beam axis. The beam column described above is also capable of dynamic focussing of the beam to take into account the relative inclination of the light valve but once again simplification is possible when the light valve is normal to the beam axis, as is the case in the described preferred embodiment.

Figure 2:
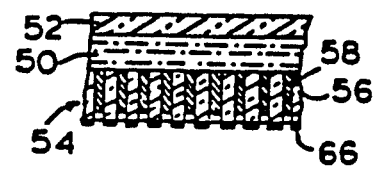
FIG. 2 shows a section through a light valve, drawn to an enlarged scale.

The light valve 12 is shown in more detail in FIG. 2 and comprises a liquid crystal material 50 sandwiched between a glass plate 52 and a liquid/vacuum interface 54. The liquid crystal material may conveniently comprise a smectic A liquid crystal or a dyed phase change guest host liquid crystal with the guest being a nematic liquid crystal.

The interface 54 is comprised of a glass capillary array 56 having very closely spaced holes of very small diameter. The holes within the glass capillary array 56 are filled with an electrically conductive material, for example an indium or other suitable alloy to form an array of closely spaced conductive pins 58. After the conductive material has filled the holes in the capillary array 56, it is etched away, as illustrated, by an suitable means, so that the surface of the pins is recessed from the surface of the glass capillary array 56. A further electrode 66 for removing any electrostatic charge on the capillary array 56 is then deposited without danger of short circuiting the pins 58.

The glass capillary array may be such as manufactured by Galileo Electro-optics Corporation of Massachussetts and used for the filtration of liquids. The holes in such a capillary array permit the manufacture of an interface with high resolution. Typically, the distance between pins is less than 13 microns and may be as little as 3 microns. The material used to fill the holes may consists of a metal or an alloy containing indium, tin, copper, lead, cadmium, bismuth and/or gallium.

In order to fill the holes, the glass capillary array is placed above a layer of the alloy in an evacuated piston cylinder apparatus. The alloy is heated to melting point and pressure is then applied to force the molten alloy into the holes of the capillary array. A rig for carrying out the above method is shown schematically in FIG. 3.

Figure 3:
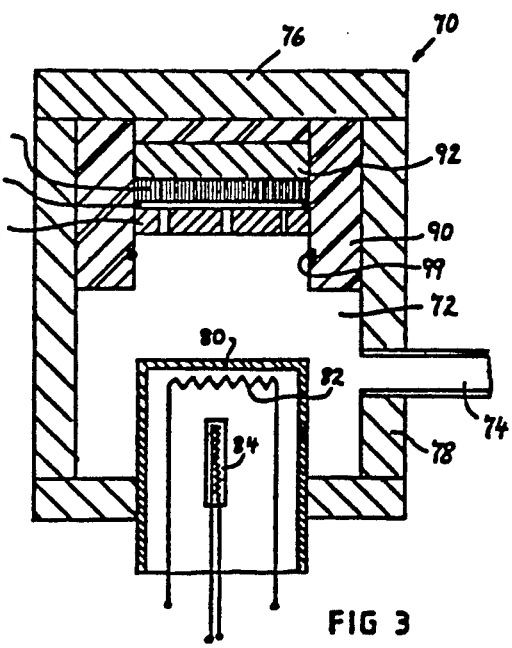
FIG. 3 shows schematically a rig for manufacturing the interface.

In FIG. 3, there is shown a metal enclosure 70 defining a chamber 72. A pipe 74 leads from the chamber 72 to a vacuum pump for evacuating the chamber 72. The upper end of the enclosure is formed of a rigid plate 76 secured to the side walls 78 of the enclosure and capable of withstanding high pressure without being deflected to any material extent.

A hollow piston 80 is slidably mounted within the chamber 72 and a suitable drive is provided (not shown) for moving the piston 80 upwards towards the plate 76. The drive may either be a manually adjustable screw or a hydraulic cylinder. A heater 82 is disposed within the piston 80 for melting the alloy which is to be forced into the holes in the glass capillary array and a thermocouple 84 permits the temperature to be monitored.

A block 90 made in several parts from a thermally insulating material, such as P.T.F.E., is provided within the chamber 72 to define an enclosure within which the alloy is melted. The block 90 is only shown schematically and its purpose is to confine the molten alloy to a small volume within which the temperature may be controlled accurately and to enable the interface to be extracted simply from the rig.

Within the block 90, there is disposed a back plate 92 against which rests the glass substrate 56. The alloy 96 to be melted is also placed within the block 90 and a spacer 98 ensures a small gap for evacuation of the holes in the glass substrate. Holes are provided in the alloy for the same purpose.

In use, the chamber 72 is evacuated with the parts held in the position illustrated. The piston is then moved upwards into the block 90 and passes in the process through an O-ring 99 which seals against the outer surface of the piston 80. The piston is stopped when it reaches the alloy 96 and the heater 82 is energised to melt the alloy. When the alloy is molten, the piston is moved up further to force the molten alloy into the holes of the glass substrate 56. As the space has previously been evacuated, the molten alloy can flow to fill the entire volume within the block 90.

The pressure which must be applied is quite substantial and would break an unsupported glass substrate. However, the backplate 92 disposed the block 90 prevents deflection and damage. The backplate 92 is separated from the plate 76 by a section of the block 90 to prevent thermal losses.

The heater is now switched off and the temperature reduced at a controlled rate until the alloy solidifies. At this time, the block 90 may be withdrawn from the enclosure and separated to allow removal of the glass substrate with the adhering alloy. The surplus alloy is machined away to leave the glass capillary array 56 complete with metal pins.

The pins may now be partially etched, as earlier described, and the surface ot the glass coated with a further electrode for the removal of electrostatic charge building up on the glass.

Though the system may be used for projection television, it is further possible to use the projection system to produce large area displays of very fine resolution as may be required, for example, in the study of large scale integrated circuits.

We claim:

1. A method of manufacturing an interface between a liquid crystal and the evacuated space of an electron beam apparatus, which interface comprises a plurality of conductive portions which extend across the thickness of an insulating substrate and which are electrically isolated from one another, the method comprising the steps of placing a glass substrate having a two dimensional array of holes of the desired size and separation formed therein within a chamber, firmly supporting the glass substrate against a backing plate, placing a solid block of metal within the chamber, evacuating the chamber, applying heat to melt the metal, urging a piston movable within the chamber towards the glass substrate to force the molten metal into the evacuated holes in the glass substrate and allowing the molten metal to cool, whereby metallic pins are formed in the holes in the glass substrate.

2. A method as claimed in claim 1, wherein the chamber is evacuated while the solid block of metal rests adjacent the glass substrate, holes being provided in the solid block of metal to permit evacuation of the holes in the glass substrate.

3. A method as claimed in claim 1, wherein the alloy is heated by means of a resistive heater disposed within the piston.

4. A method as claimed in claim 1, wherein metal is heated inductively.

5. A method as claimed in claim 1, wherein the substrate and the metal are confined within a thermally insulating block within the chamber to restrict the heat losses and to permit extraction of the interface from the chamber.

6. A method as claimed in claim 1, comprising machining and grinding at least one surface of the glass substrate in order to remove surplus metal from that surface.

7. A method as claimed in claim 1, comprising etching the metallic pins so that their ends lie beneath at least one surface of the glass substrate, and forming an electrically conductive layer on said one surface.

8. A method as claimed in claim 1, wherein the distance between the centers of adjacent pins is less than 13 $\mu$m.

9. A method of manufacturing an article comprising a plate-form member of dielectric material and a plurality of conductive portions which extend across the thickness of the plate-form member and which are electrically isolated from one another, the method comprising the steps of placing a glass substrate having a two dimensional array of holes of the desired size and separation formed therein within a chamber, firmly supporting the glass substrate against a backing plate, placing a solid block of metal within the chamber, evacuating the chamber, applying heat to melt the metal, urging a piston movable within the chamber towards the glass substrate to force the molten metal into the evacuated holes in the glass substrate and allowing the molten metal to cool, whereby metallic pins are formed in the holes in the glass substrate.

* * * * *